Patented July 27, 1943

2,325,531

UNITED STATES PATENT OFFICE 2,325,531

METHOD OF PRODUCING COATINGS

Willi Mertens, Berlin-Zehlendorf, Germany; vested in the Alien Property Custodian No Drawing. Application December 14, 1939, Serial No. 309,192. In Germany December 19, 1938

5 Claims. (Cl. 117—128)

This invention relates to a method of producing coatings on wires and sheets as well as films of polybutylene hardened by interpolymerization.

My copending application Serial No. 202,011, filed April 14, 1938, discloses a method of hardening plastic substances with linear chain molecules such as polyisobutylene according to a so-called pseudo-vulcanization method which comprises treating these substances with interpolymerizable mixtures, particularly with a mixture of styrene and divinylbenzol, and then subjecting them to an interpolymerization. The interpolymerizable mixtures should contain at least two substances capable of being polymerized, at least one of which contains two polymerizable atom groups. For instance, as mentioned in Serial No. 202,011, a mixture of styrene and divinylbenzol in a proportion of 55% to 1% is used for hardening a resinous base substance formed of polyisobutylene.

According to the present invention a polyisobutylene mixture hardened by the above mentioned pseudo-vulcanization according to the above-mentioned copending application is employed in the production of films or coatings on wires or sheets in order to take advantage of the favorable properties of this mixture also for this field of application. By the expression "coating" is understood the application of thin layers by spraying, spreading or immersion process and also, particularly, by varnishing and the like methods. The invention is based on the following phenomenon. As I have described in another copending application, Serial No. 295,606, filed September 19, 1939, a polyisobutylene mixture hardened by the above-mentioned pseudo-vulcanizing method can again be softened by a mechanical treatment, in particular a mastication or kneading process. It has further been found that a hardened polyisobutylene mixture also becomes again soluble by such a kneading treatment, for instance, when worked between rolls in mills or the like. The present invention utilizes the last-mentioned peculiarity of pseudo-vulcanized polyisobutylene mixtures and consists in forming a solution of such a mixture after it has first been hardened and then masticated for the purpose of forming films or coatings. It has further been found that it is not immaterial what solvent is employed in bringing the hardened polyisobutylene mixture, rendered again soluble by kneading, in such a state as to form a film or coating.

It has been found advantageous that the solvents to be employed must dissolve or at least swell both the polyisobutylene component and the interpolymer component (for instance, the styrene-divinylbenzol polymer), since otherwise, when only one component is dissolved, the other components would form flakes and the solution would be apt to decompose. Consequently, solvents containing an aliphatic and aromatic component are used according to the invention for producing film or coat-forming solutions of pseudo-vulcanized and kneaded polyisobutylene mixtures. Toluene has proved particularly suitable, but xylene and mixtures of petrol ether and benzol are also applicable. Benzol alone is less suitable, although it is possible to produce coatings therewith whose surfaces are sometimes not quite smooth.

The solutions produced according to the invention are not ropy but more or less thinly liquid, since the interpolymer component hardly influences the viscosity. The liquid layers made of the solutions are dried for a few minutes at room temperature. The resulting films and coatings are brilliant and flexible, and adhere properly to all metals and glass. Films may be produced, for instance, in the manner that the glass plates are slightly moistened, for instance, by breathing upon the glass plate or by exposing it to very slight amounts of vapor prior to the application of the solution thereto. The films thus produced may then be removed in the form of very thin skins.

The most favorable mixture for the production of films or coatings has proved to be a mixture of 40% polyisobutylene ("Oppanol") and 60% styrene-divinylbenzol polymer.

By heating the mixture above 130 degrees centigrade, the films or coatings thus produced may be rendered more solid and completely inadhesive. This hardening is preferably effected, as also described in the copending application Serial No. 295,606, in an atmosphere free of, or at least poor in, oxygen. This rehardening may also be effected in a particularly suitable manner with the aid of superheated steam, for instance, according to the counter-flow method, in which case the steam flows in a direction opposite to the motion of the coated wires or sheets or of the films produced on the glass plates. This method has the further advantage that the evaporated solvent may be recovered by condensating the vapors. This method is also advantageous in that the subsequent hardening may be effected in an atmosphere more or less free of oxygen.

An additional coating of any thickness, consisting of polystyrene, polyvinylcarbazol or the like with or without softening agents, may be applied in the form of a hard protective layer on the coating or film according to the invention.

The coatings made according to the invention may serve as an electrical insulation for wires and sheets or as a dielectric of small dielectric losses in condensers and the like. Coatings according to the invention are also advantageous in cases where bodies are to be provided with waterproof coatings resistant to ageing, or containers with an inside so as to be protected against acids.

For instance, glass bottles lined with a coating according to the invention are protected against hysrofluoric acid or hydrogen superoxide.

What is claimed is:

1. The method of producing layers from polyisobutylene, which comprises the steps of hardening polyisobutylene by interpolymerizing it with a mixture of styrene and divinylbenzol, masticating the hardened interpolymer to render it resoluble, dissolving the masticated interpolymer with a solvent, and applying the solution thus obtained to a surface to produce a layer.

2. The method of producing layers from polyisobutylene, which comprises the steps of hardening polyisobutylene by interpolymerizing it with a composition of styrene and divinylbenzol, masticating the hardened interpolymer to render it resoluble, dissolving the masticated interpolymer in a solvent having an aliphatic and an aromatic component, applying the solution to a surafce to deposit a resinous layer, and drying said layer.

3. The method of producing layers from polyisobutylene, which comprises the steps of interpolymerizing polyisobutylene with styrene admixed with divinylbenzol thereby hardening the polyisobutylene, masticating the hardened interpolymer to render it resoluble, dissolving the masticated interpolymer in a solvent having an aliphatic and an aromatic component, applying the solution to a surface to deposit a resinuous layer, and rehardening the interpolymer by subjecting the layer to superheated steam.

4. The method of producing resinous layers, which comprises interpolymerizing about 40% polyisobutylene and about 60% of divinylbenzol-containing styrene thereby obtaining a hardened interpolymer, masticating the hardened interpolymer to render it resoluble, dissolving the masticated interpolymer in a solvent having an aliphatic and an aromatic component, and applying the solution to a surface to deposit a resinous layer.

5. The method of providing condenser electrodes with a dielectric coating which comprises the steps of interpolymerizing polyisobutylene with a mixture of styrene and divinylbenzol thereby obtaining a hardened interpolymer, masticating the hardened interpolymer to render it resoluble, dissolving the masticated interpolymer in a solvent having an aliphatic and an aromatic component, applying the solution to the electrode surface to deposit a coating, and subjecting the coating to heat in order to remove the solvent.

WILLI MERTENS.